United States Patent [19]

Squires

[11] Patent Number: 4,895,748

[45] Date of Patent: Jan. 23, 1990

[54] FLOCKED FOAM FABRIC WITH FLATTENED FIBERS WHICH ARE COLOR PRINTED

[76] Inventor: William J. Squires, 26 E. Hunting Ridge Rd., Stamford, Conn. 06903

[21] Appl. No.: 332,543

[22] Filed: Apr. 3, 1989

[51] Int. Cl.$^4$ .............................................. B32B 33/00
[52] U.S. Cl. ...................................... 428/88; 427/198; 427/200; 427/202; 427/203; 427/206; 428/89; 428/90; 428/95; 428/96; 428/196
[58] Field of Search ........................ 428/88, 89, 90, 95, 428/96, 196; 427/198, 200, 202, 203, 206

[56] References Cited

U.S. PATENT DOCUMENTS

| | | | |
|---|---|---|---|
| 2,901,373 | 3/1957 | Weiss | 428/89 |
| 3,215,584 | 11/1965 | McConnel et al. | 428/90 |
| 3,262,128 | 7/1966 | Morgan et al. | 427/206 |
| 3,528,874 | 9/1970 | Spencer | 428/95 |
| 3,591,401 | 3/1969 | Snyder et al. | 428/95 |
| 4,018,956 | 4/1977 | Casey | 428/86 |
| 4,362,773 | 12/1982 | Shikinami | 428/90 |
| 4,418,106 | 11/1983 | Landler et al. | 428/89 |

OTHER PUBLICATIONS

Stork-RT-TV Rotary Screen Printing Machine, RD-IV Universal Rotary Screen Printing Systems (Stork).
Stork-Unlimited Possibilities in Thermal Processing.
Stork-the Stork TC 101 and TC 131 Transfer Printing Machines.
Kannegiesser-Heat Transfer Printing Machines.

*Primary Examiner*—Marion C. McCamish
*Attorney, Agent, or Firm*—Darby & Darby

[57] ABSTRACT

A flocked polyurethane foam fabric and method for manufacturing the same for which flock fibers imbedded in an adhesive on the foam are permanently flattened and entangled. Dry ink is transferred onto the flock fibers at the same time that flattening of the fibers is taking place. The flock fibers are thermally set into their flattened state along an outer surface of a polyurethane foam base of the fabric. Flattening the flock fibers causes the entanglement of the flock, thereby improving the hand, appearance, drapeability, abrasion resistance, water repellency and heat insulation qualities for apparel items over that of unflattened flock fibers.

19 Claims, 1 Drawing Sheet

| | |
|---|---|
| PRINT | 6 |
| FLOCK | 5 |
| ADHESIVE | 4 |
| POLYURETHANE FOAM | 3 |
| POLYESTER RASCHEL KNIT | 2 |
| POLYURETHANE FOAM | 3 |
| ADHESIVE | 4 |
| FLOCK | 5 |

| | |
|---|---|
| PRINT | 6 |
| FLOCK | 5 |
| ADHESIVE | 4 |
| POLYURETHANE FOAM | 3 |
| POLYESTER RASCHEL KNIT | 2 |
| POLYURETHANE FOAM | 3 |
| ADHESIVE | 4 |
| FLOCK | 5 |

FLOCKED FOAM FABRIC WITH FLATTENED FIBERS WHICH ARE COLOR PRINTED

FIELD OF THE INVENTION

The present invention relates to a flocked foam fabric, which has thermally set flattened flock and on which solid colors or patterns are printed.

BACKGROUND OF THE INVENTION

It is known to form a flocked foam fabric by adhering synthetic flock fibers to closed-cell polyurethane foam as is disclosed in U.S. Pat. No. 3,528,874. Potential uses for the flocked foam are as blankets or children's garments.

The manufacture of a flocked foam fabric based on the teaching of this patent is known starting from a composite consisting of two ends of 100% 150 denier filament polyester raschel knit fabric sandwiched between two layers of 0.0625 mm polyurethane open cell foam (white or colored). A clear or colored acrylic adhesive is then applied to one side of the composite. Thereafter, fibers of nylon (a 3 den type 66 nylon cut to 0.08 inches in length as manufactured by DuPont) are flocked into the adhesive. The flocked foam is then cured at 320° F. for approximately six minutes. The flocked foam is then turned over and the process is repeated on the other side. The end result is a double-sided flocked foam fabric for use as a blanket product, sold under the trademark VELLUX. (For convenience, this blanket construction will be referred to later on as a VELLUX blanket).

Based on the teaching of this patent, flocked foam blankets have been made which have upright flock fibers, forming a stand up pile. The blanket has poor drapeability and therefore is not particularly suited for apparel items. From an aesthetic point of view, a consumer would not like to wear a garment that looks like a blanket.

Due to the fibers being upright in the stand up pile, there is little abrasion resistance. The fibers can be pulled out by hand since they are only imbedded into the adhesive on the foam. Also, some of the adhesive inevitably is pulled out with the fibers, creating unsightly gaps in the fabric. This ease in pulling out fibers makes it difficult for flocked foam with upright fibers to meet industry abrasion requirements for apparel items, especially at critical wear points such as the collar, cuffs, etc.

Further, the ability to pull out the fibers is a liability, especially when the fabric is used in children's sleeping wear. Children may chew on the fabric, thereby pulling out the fibers with their teeth. This danger that a child may swallow the pulled out fibers is a risk that children's sleeping wear manufacturers may be unwilling to take.

Some techniques have been devised to change the texture or feel of the flocked fabric. For flocked polyurethane fabric, the length of the flock fibers can be changed to produce a different grade or feel of imitation fur obtained. The longer the flock, the smoother it feels. Embossing techniques to change the feel of a flocked surface have been employed for some types of flocked foam fabrics other than those with polyurethane foam and are generally used for wall paper, rather than for apparel items.

Embossing a flocked plastisol foam surface covering is known from U.S. Pat. No. 3,591,401. The embossing is effected at 190° C. by a cool embossing roll and results in permanent depressions in the foam structure and the appearance of the embossed area gives the impression of a tufted carpet. A printed decorative layer is beneath the transparent flock.

Embossing a flocked plastic foam applied to a polyester web or carrier sheet is known from U.S. Pat. No. 4,418,106. The embossing is effected by feeding the composite body between rollers at elevated temperatures to change its surface texture to have the feel of either a suede-like felted surface with deflected fibers, a woven or knitted textile surface or a leather-like surface. The carrier sheet may be secured to a polyurethane foam backing.

Embossing modacrylic flocked polybutadiene foam to obtain a permanently flattened flock surface in the embossed recesses is known from U.S. Pat. No. 4,362,773. To obtain colored patterns, flocks with dissimilar patterns are used. This patent also teaches away from imbedding nylon flock at elevated temperatures and pressures in polyurethane foam by describing such a process as being unobtainable with its high temperature welder.

Imbedding synthetic fibers into a polyurethane adhesive on a wool fabric at elevated temperatures and pressures is known from U.S. Pat. No. 3,262,128, which produces a fabric having improved drapeability, abrasion resistance, water repellency and strength. After the desired imbedding is obtained, the flock fibers straighten to their pre-pressed state. Thus, the flock fibers are not permanently deformed.

In addition to the texture or feel of the fabric, another major concern in the apparel industry is color consistency.

Color consistency is crucial in the apparel industry. Unlike blankets which are sold individually and typically not shown together, apparel items are sewn together at seams and commonly sold together. Thus, even slight differences in the color at the seams or between left and right apparel "pairs" (e.g. slippers) will create a commercial disaster even for an otherwise excellent apparel fabric.

Some ways to achieve consistency in color on flocked fabric include selectively applying fibers of dissimilar colors or applying a flock dissolving agent containing a dye. Such methods are time consuming and expensive in that they require that special care be taken in first obtaining the different colored fibers or batches of dissolving agents of various dyes and then selectively applying the colors to avoid inadvertent mixing of dissimilar colors. The use of the dissolving agent can lead to differences in the feel of the flock due to differences in the shortening of the flock if the process is not carefully controlled.

There is a limited number of colors that are commercially available as "off the shelf" items for colored flock. Unless an additional investment is made to recolor the commercially available flock or pay a premium for custom colored flock, garment manufacturers are limited to the colors which are commercially available.

Before adhering the flock to the foam by an adhesive in the acrylic latex family, in accordance with the teaching from the Spencer patent, the polyurethane foam layer is fed through printing equipment to achieve a colored pattern. Alternatively, a colored adhesive is applied. Such techniques, although simpler to do than selectively applying colored fibers or dyes, create color inconsistency problems due to the nature of polyurethane foam manufacture.

Polyurethane foam is manufactured by foaming polyurethane which requires expanding a ball (e.g. a baloney) of polyurethane with air, thereby generating air bubbles, which vary in size from the inside to the outside of the ball. Due to the presence of these bubbles, the rate of absorption of the colored adhesive at different areas of the ball varies, thereby preventing the attainment of uniformity of color. Each production lot of the foam therefore varies in color from the color of the next lot because the adhesive color matching is not precise.

In addition, the foam must be cut to its correct thickness, which is subject to cutting tolerances. For instance, if the foam is cut to a 0.06 inch thickness, experience has shown that this thickness may vary by as much as 0.01 inches. This difference in thickness creates differences in the amount of the color adhesive which is absorbed at different areas of the foam, thereby adversely affecting the attainment of uniformity of color.

Further, polyurethane is very sensitive to exposure to light and the gases in the air, which tend to discolor the polyurethane over time. This discoloring effect makes it impossible for any given production lot of the foam to have the exact color as the next.

Even if these color inconsistency problems were overcome, there would still remain the problem that the coloring lies beneath the flock. The color of the fabric will appear to be that of a blend of colors as between the color of the flock and the coloring beneath the flock. For instance, the apparent color of a fabric having white flock on a black dyed foam will appear to be a shade of gray. Further, the blending of the flock and foam colors make it difficult to achieve desired pure colors. The color underneath the foam will not appear to be as clear or crisp when viewed through the flock.

To obtain a dyed blanket, it is necessary to cut the roll of fabric material to blanket size, dye the blanket individually and then dry it individually in a dryer. Practically speaking, drying the entire roll of material cannot be done since the dryer required would be too huge. For apparel items, where the fabric is rolled out on a table and then into different-sized pieces that are to be sewn together at seams, it is too cumbersome and not practical economically to dye each individual piece separately.

It is known to use a dry ink transfer process for printing onto wovens or knits of synthetic fibers such as polyesters, polyamide, acrylic, triacetate and acetate. This process involves feeding together a knit or woven fabric and specially inked thermal paper between rollers at elevated temperatures and pressures such that the ink is transferred onto the knit or woven fabric.

Especially for apparel items, it would be desirable to provide a flocked polyurethane foam fabric that provides better drapeability, hand, appearance wearability, abrasion resistance, wrinkle resistance, thermal insulation characteristics and color consistency than does flocked polyurethane foam fabric with upstanding flock fibers so that the fibers are not easily pulled out.

SUMMARY OF THE INVENTION

The present invention is directed to a flocked foam fabric and method for producing the same that provides improved drapeability, wearability, abrasion resistance, softness, wrinkle resistance and thermal characteristics.

It is a further object to provide uniformity of color to the fabric.

One aspect of the present invention resides in a flocked foam fabric composed of polyurethane foam and a nylon flock adhered to the foam by a latex acrylic adhesive. The flock is permanently flattened by thermally setting the flock in a flattened state along the foam surface at elevated temperatures and pressures such that the flock remains flattened and entangled even after repeated washings.

Another aspect resides in transferring dry ink onto the flattened flock to provide desired solid colors or colored patterns. The dry ink transfer process may be effected by feeding the flocked foam fabric and a sheet of dry inked paper together between rollers, one of the rollers being heated. The pressure and temperature provided by the rollers is of such a magnitude that the flock fibers thermally set into a flattened state and the dry ink, which is on a surface of the paper that is against the flock, transfers onto the flock. Thus, flattening and printing onto the flock takes place simultaneously.

For a better understanding of the present invention, reference is made to the following description and accompanying drawings, while the scope of the invention is set forth in the appended claims.

DESCRIPTION OF THE PREFERRED EMBODIMENTS

Figure 1:
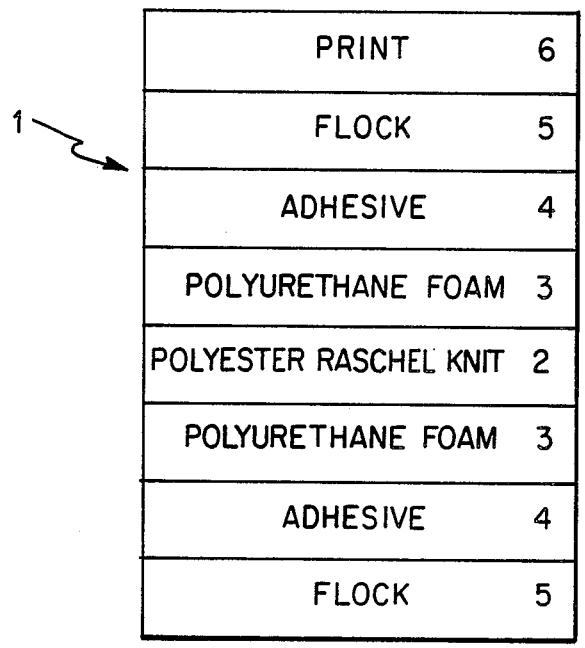
FIG. 1 is a schematic cross-section of the flocked foam fabric in accordance with the present invention.

Turning to FIG. 1, the flocked foam fabric 1 includes layer of 100% 150 denier polyester or nylon raschel knit 2, polyurethane foam 3 on both sides of the scrim 2, an acrylic adhesive 4 on the outer side of the polyurethane foam 3, flattened flock 5 imbedded into the foam 3, and colored dry ink 6 on the flattened flock 5. The aforementioned prior art VELLUX blanket construction is similar to this construction, except that the flock remains standing upright unflattened, the adhesive and/or the foam is colored instead of the flock being printed on top with dry ink, and there is one end of nylon filament in a raschel knit rather than two ends of polyester filament.

Figure 2:
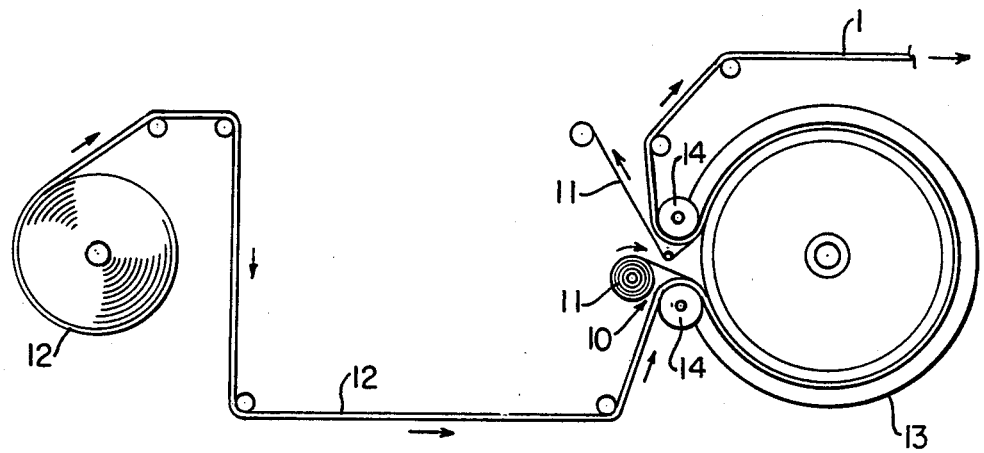
FIG. 2 is an elevational schematic view of the flocked foam fabric being subjected to a dry ink transfer process in accordance with the present invention.

FIG. 2 illustrates the dry ink transfer process used to both flatten and entangle the flock fibers and transfer dry ink onto the flock. A pattern or solid color 10 is printed first onto special print paper 11. The print paper 11 and flocked foam fabric 12 are fed together between rollers 13, 14 in a dry ink transfer machine. The pattern or solid color 10 is against the flock of the flocked foam fabric. At least one of the rollers 13 is heated at a temperature of approximately 400° C. and pressure is applied by the rollers against the fabric and sheet for approximately 15 seconds to enable the transference of the dry ink of a multi-colored print pattern or a solid color 10 onto the flock. Instead of rollers, any type of pressure elements, such as pressure plates, could be used.

For apparel, it is recommended that the burst strength of the fabric be increased from approximately 40–50 lbs. (suitable for blankets) to approximately 80–90 lbs. by using two ends of 100% 150 denier polyester filament in a raschel knit fabric.

There are approximately 45,000,000 fibers per square yard of the fabric which become flattened and entangled, thereby creating much greater cover over the foam than is the case for fibers which remain upright. At the same time that the flock is flattened, it entangles itself and is thermally set into a permanent flattened state at this elevated temperature. The end result is a fabric having a soft, luxurious hand which accepts the print readily. The back of the fabric is slightly flattened, but still gives the effect of a short pile lining.

During the flattening process, the flock fibers on the front face flatten completely and become entangled, the flock fibers on the back face flatten partially and the foam thickness decreases. The flocked foam fabric becomes drapeable enough to be used for apparel items.

Where lighter weight fabrics are desired, i.e. for shirts, dresses, sweatsuits, etc., the pile is used on only one side rather than both. By only having the pile on one side, the drape improves dramatically by as much as 50% and the hand is much softer. These two factors are also dependent on the substrate used on the back, e.g., brushed tricot is suitable as the substrate to provide desired strength, additional softness, light weight, and additional drapeability.

In addition, the flattening process causes wearability to improve, since it is much more difficult to pull out the flattened and entangled fibers than would be the case if they remained upright. Further, flattening and entangling the flock improves wrinkle resistance and thermal insulating characteristics without adding any additional weight.

The flocked foam fabric produced in accordance with the present invention has an outer shell with a pile lining, all in one. No separate lining needs to be sewn in, which results in a savings in manufacturing costs over other apparel fabrics which require separate linings. In addition, heat insulating characteristics are improved due to this "built-in" lining.

In addition, water repellency of the fabric improves by virtue of the flock becoming entangled and flattened. If desired, water repellency can be further enhanced by adding well known water repellency chemical agents to the fabric after flattening and entangling of the flock.

Since printing is effected on top of the flocked foam fabric, rather than on surfaces under the flock, the colors appear to be richer and clearer. Color quality consistency is improved for solid colors and are virtually non-existent for multi-color prints, which in most cases cover nearly all, if not all, of the top face. Any slight variances in color consistency that may arise are very difficult to see because of the overall clear and crisp impression afforded by printing colors on top of the flock.

It is advantageous to both dye the foam and then print onto the flock (after imbedment) with the same base color. This improves the attainment of "pure" solid colors.

As an alternative to dry ink, wet ink could be transferred directly from rollers, except that the resulting color prints will not be as clear.

While the foregoing description and drawings represent the preferred embodiments of the present invention, it will be understood that various changes and modifications may be made without departing from the spirit and scope of the present invention.

What is claimed is:

1. A flocked foam fabric, comprising:
   a foamed polyurethane element having an outer surface;
   flock fibers; and
   means for adhering the flock fibers onto said outer surface, said flock fibers having an end imbedded into said adhering means and a portion projecting out of said adhering means, said portion being thermally set into a flattened and entangled state along said outer surface of said foamed element so as to provide a substantially flat surface with entangled flock fibers.

2. The fabric according to claim 1, wherein said flock fibers are synthetic.

3. The fabric according to claim 2, wherein said fibers are composed of nylon.

4. The fabric according to claim 1, further comprising:
   ink of a solid color on said fibers in said flattened and entangled state.

5. The fabric according to claim 4, further comprising:
   a plurality of dissimilar colored inks each selectively applied to selective areas of said flock in said flattened state to form a multi-colored pattern.

6. The fabric according to claim 1, wherein said adhering means is a latex acrylic adhesive.

7. The fabric according to claim 1, wherein said flock fibers in said flattened and entangled state provide greater cover on said foamed polyurethane element than said flock fibers standing upright in an unflattened state so as to provide, better water repellency, better drapeability, better abrasion resistance, more heat insulation and greater resistance to being pulled out than does said fibers standing upright in the unflattened state.

8. The fabric according to claim 1, wherein said portion is thermally set so that even after repeated washing said portion remains in a flattened and entangled state.

9. The fabric according to claim 1, further comprising:
   two ends of filament in a raschel knit fabric against the foamed polyurethane element.

10. A method of making a flattened flock foam fabric, comprising the steps of:
    flattening and entangling a portion of flock fibers of a flocked polyurethane foam fabric, each of the fibers having an end imbedded in an adhesive on a foamed polyurethane element of the flocked polyurethane foam fabric so that said flock fibers are in a flattened and entangled state along an outer surface of the foamed polyurethane element; and
    thermally setting said portion of flock fibers in the flattened and entangled state.

11. A method according to claim 10, further comprising the step of:
    transferring ink onto the flattened and entangled flock fibers.

12. A method according to claim 11, wherein said transferring includes transferring dry ink from a paper sheet onto the flattened and entangled flock fibers.

13. A method according to claim 11, wherein the steps of flattening and entangling, thermally setting and transferring take place simultaneously.

14. A method according to claim 10, wherein the step of flattening and entangling includes feeding the flocked polyurethane foam fabric between pressure elements which apply pressure for flattening the flock fibers, the step of thermally setting including heating at least one of the pressure elements to a predetermined temperature to thereby cause the fibers to thermally set in the flattened state.

15. A method according to claim 10, wherein the step of flattening and entangling includes feeding together both the flocked polyurethane foam fabric and a thermal sheet between pressure elements which apply pressure for flattening the flock fibers, the sheet having dry ink on a side that is against the flock fibers, the step of thermally setting including heating at least one of the pressure elements to a predetermined temperature so as to cause the flock fibers to thermally set in the flattened and entangled state and to cause the dry ink to transfer onto the flock fibers.

16. A method according to claim 15, further comprising:

dyeing the polyurethane foam fabric with a solid color before adhering the flock fibers to the polyurethane foam fabric, the dry ink including at least one ink of said solid color.

17. A method according to claim 15, wherein the adhesive has a solid color and the dry ink has at least one ink of the same solid color.

18. A method according to claim 10, further comprising:

forming an apparel item with the flattened and thermally set flocked polyurethane foam fabric.

19. A method according to claim 10, further comprising:

dyeing the flocked polyurethane foam fabric.

* * * * *